(12) United States Patent
Pasquet (10) Patent No.: US 9,759,197 B2
(45) Date of Patent: Sep. 12, 2017

(54) WIND TURBINE ROTOR

(75) Inventor: Pierre Pasquet, Alella (ES)

(73) Assignee: ALSTOM Renewable Technologies, Grenoble (FR)

( * ) Notice: Subject to any disclaimer, the term of this patent is extended or adjusted under 35 U.S.C. 154(b) by 751 days.

(21) Appl. No.: 13/989,326

(22) PCT Filed: Nov. 29, 2011

(86) PCT No.: PCT/EP2011/071274
§ 371 (c)(1),
(2), (4) Date: May 23, 2013

(87) PCT Pub. No.: WO2012/072627
PCT Pub. Date: Jun. 7, 2012

(65) Prior Publication Data
US 2013/0243599 A1 Sep. 19, 2013

(30) Foreign Application Priority Data
Nov. 30, 2010 (EP) .................................. 10382322

(51) Int. Cl.
*F03D 7/02* (2006.01)
*F03D 11/00* (2006.01)
*F03D 80/00* (2016.01)

(52) U.S. Cl.
CPC ............ *F03D 11/00* (2013.01); *F03D 7/0224* (2013.01); *F03D 80/00* (2016.05);
(Continued)

(58) Field of Classification Search
CPC .................................................. F03D 7/0224
(Continued)

(56) References Cited

U.S. PATENT DOCUMENTS

| 3,888,357 A * | 6/1975 | Bauer | B66C 23/84 |
| | | | 212/175 |
| 2005/0196280 A1* | 9/2005 | Gonzalez | F03D 7/0204 |
| | | | 416/131 |

(Continued)

FOREIGN PATENT DOCUMENTS

| DE | 196 34 059 | 10/1997 |
| EP | 1 286 048 | 2/2003 |

(Continued)

OTHER PUBLICATIONS

International Search Report and Written Opinion for PCT/EP2011/071274, mailed Mar. 7, 2012, 12 pgs.

*Primary Examiner* — Richard Edgar
*Assistant Examiner* — Su Htay
(74) *Attorney, Agent, or Firm* — Dority & Manning, P.A.

(57) ABSTRACT

The invention relates to a wind turbine rotor comprising a hub, a plurality of blades, and at least one pitch mechanism for rotating at least one of the blades, each pitch mechanism comprising a partial ring gear, a pitch bearing, a pinion that is arranged to mesh with the partial or complete ring gear and a pitch motor arranged for driving said pinion, wherein the pitch bearing is mounted between the hub and a blade, and the ring gear is mounted on the hub or on the blade. The invention further relates to a method of repairing a partial or complete ring gear in a wind turbine rotor, the ring gear comprising a plurality of segments, the method comprising detaching at least a segment of the ring gear and attaching the ring gear in a modified configuration.

14 Claims, 6 Drawing Sheets

(52) U.S. Cl.
CPC ....... *F05B 2230/80* (2013.01); *F05B 2260/79* (2013.01); *Y02E 10/723* (2013.01); *Y02P 70/523* (2015.11); *Y10T 29/49318* (2015.01)

(58) Field of Classification Search
USPC .............................. 416/47, 48, 155, 156, 158
See application file for complete search history.

(56) References Cited

U.S. PATENT DOCUMENTS

| | | | | |
|---|---|---|---|---|
| 2007/0104577 | A1* | 5/2007 | Hansen | F03D 7/0224 416/104 |
| 2007/0231137 | A1* | 10/2007 | Nitzpon | F03D 1/0658 416/43 |
| 2009/0220343 | A1* | 9/2009 | Dimascio | F03D 1/003 416/161 |
| 2010/0143136 | A1 | 6/2010 | Daniels et al. | |
| 2013/0309069 | A1* | 11/2013 | Pandya | F03D 11/0008 415/124.1 |

FOREIGN PATENT DOCUMENTS

| | | |
|---|---|---|
| EP | 1 571 334 | 9/2005 |
| WO | WO 99/23384 | 5/1999 |
| WO | WO 00/61942 | 10/2000 |
| WO | WO 2006/032438 | 3/2006 |

\* cited by examiner

WIND TURBINE ROTOR

The present invention relates to wind turbine rotors, and more particularly relates to wind turbine rotors comprising at least one pitch mechanism. The invention further relates to a method of repairing a ring gear of a pitch mechanism.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

Pitch systems are employed for adapting the position of a wind turbine blade to adapt to varying wind conditions. In this respect, it is known to rotate a wind turbine blade in such a way that it generates less lift (and drag) when the wind speed increases. In this way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

Pitch systems generally comprise an electric or hydraulic motor which, through the use of reduction gearing (sometimes referred to as a "reductor", or as a "reduction drive"), drives an actuating gear. Said actuating gear meshes with an annular gear provided on the wind turbine blade to set the wind turbine blade into rotation. Other actuating mechanisms operated by a pitch motor are however also known.

It is further known to provide an individual pitch system (comprising a separate motor and separate control) for each wind turbine blade of a rotor. It is also known to provide a common pitch system wherein the pitch angle of the blades is the same for all blades on a rotor. Such a common pitch system may comprise a single motor or may comprise a plurality of motors, one for each blade.

A control strategy of a pitch system that is often employed in variable speed wind turbines is to maintain the blade in a predefined "below rated pitch position" at wind speeds equal to or below nominal wind speed (for example approximately 4 m/s-15 m/s). Said default pitch position may generally be close to a 0° pitch angle. The exact pitch angle in "below rated" conditions depends however on the complete design of the wind turbine. Above the nominal speed (for example from approximately 15 m/s-25 m/s), the blades are rotated to maintain the aerodynamic torque delivered by the rotor substantially constant. When the wind turbine is not operating, the blades may assume a vane position (e.g. at or around 90° pitch angle) to minimize the loads on the blades. During most of the wind turbine's life, a blade may however be in the below rated pitch position. The nominal wind speed, cut-in wind speed and cut-out wind speed may of course vary depending on the wind turbine design.

In pitch systems comprising an annular gear (or "ring gear"), the annular gear is generally provided along an inner perimeter or outer perimeter of the pitch bearing. The pitch bearing comprises an inner ring and an outer ring and one or more rows of rolling elements between them. The inner ring may be connected with the hub and the outer ring may be connected with the blade or vice versa. The annular gear is provided on either the inner or outer bearing ring and is generally machined as an integral piece with the bearing.

Since the loads transmitted by the pitch motor and gearing are heavy, alternating in direction, cyclical and mainly concentrated on a reduced sector of the annular gear, the annular gear can be subjected to wear, especially in the flanks of the teeth. For example, repetitive contact between teeth of the annular gear and a pinion of the pitch system may cause e.g. fretting. Since the below rated pitch position is the prevailing position for most wind turbines, the contact between the teeth and its consequences is concentrated on the same teeth. The annular gear may thus require regular maintenance, which may be complicated and expensive.

One solution that has been proposed for reducing the wear of the annular gear is an induction hardening of the teeth of the gear. This solution however is rather expensive.

The present invention has the objective to provide a wind turbine rotor that at least partially solves one or more of the aforementioned problems.

SUMMARY OF THE INVENTION

In a first aspect, the invention provides a wind turbine rotor comprising a hub, a plurality of blades, and at least one pitch mechanism for rotating at least one of the blades, each pitch mechanism comprising a partial ring gear, a pitch bearing, a pinion that is arranged to mesh with the partial or complete ring gear and a pitch motor arranged for driving said pinion, wherein the pitch bearing is mounted between the hub and a blade, and the ring gear is mounted on the hub or on the blade.

A partial ring gear in this sense is to be understood as a ring gear which does not form a complete ring, i.e. does not cover 360°.

In this aspect of the invention, the functions of the bearing and the annular gear have been separated in two separate components. The bearing can thus be manufactured much cheaper. The ring gear may also be more easily repaired and more cheaply substituted if necessary due to the separation of components. With this design, the pitch bearing's reliability may also be improved.

In some embodiments, the ring gear may be mounted on the blade. In other embodiments, the ring gear may be mounted on the hub. Blades may furthermore comprise an extender, the pitch bearing being arranged between the hub and extender.

In some embodiments, the pitch bearing may comprise an inner bearing ring and an outer bearing ring, wherein the inner bearing ring is connected with the hub and the outer ring is connected with the blade. In alternative embodiments, the pitch bearing may comprise an inner bearing ring and an outer bearing ring, wherein the inner bearing ring is connected with the blade and the outer ring is connected with the hub.

In some embodiments, the pitch mechanism furthermore comprises a motor support flange for supporting the pitch motor, said motor support flange being connected at the hub. Such a flange may be a separate component attached at the hub or may be formed integrally with the hub. In alternative embodiments, the pitch mechanism may furthermore comprise a motor support flange for supporting the pitch motor, said motor support flange being mounted between the hub and the blade. In yet further embodiments, such a flange may be attached at or formed integrally with a blade or extender.

In some embodiments, the ring gear may be a partial ring gear covering approximately a 90 degrees arc. Since not the whole 360° ring gear is necessary for common use of the wind turbine, only a partial ring gear may be provided. In most embodiments, a sector covering approximately 90° will be enough to cover all common pitch situations, including assuming a vane position. In some embodiments, the partial ring gear may cover an arc of between 85°-120°.

In some embodiments, the partial ring gear may comprise a plurality of segments. Generally, the wear of the annular gear will be concentrated on one or a few teeth, because a blade may assume the "below rated" pitch position for the largest part of its lifetime. By providing a plurality of segments, one segment can replace another segment when such a segment shows signs of significant wear.

In a second aspect, the present invention provides a method of repairing a partial or complete ring gear in a wind turbine rotor, the ring gear comprising a plurality of segments, the method comprising detaching at least a segment of the ring gear and attaching the ring gear in a modified configuration.

In this aspect, the configuration of the ring gear may be changed by e.g. inverting a segment, switching positions of two segments, or other. With the new configuration, different teeth of the ring gear will be in contact with the pinion of the pitch mechanism. Instead of having to replace the whole ring gear or having to re-machine certain teeth of a ring gear, the damaged teeth may still be used but are put in a position wherein they will be less frequently in touch with the pinion.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1A:
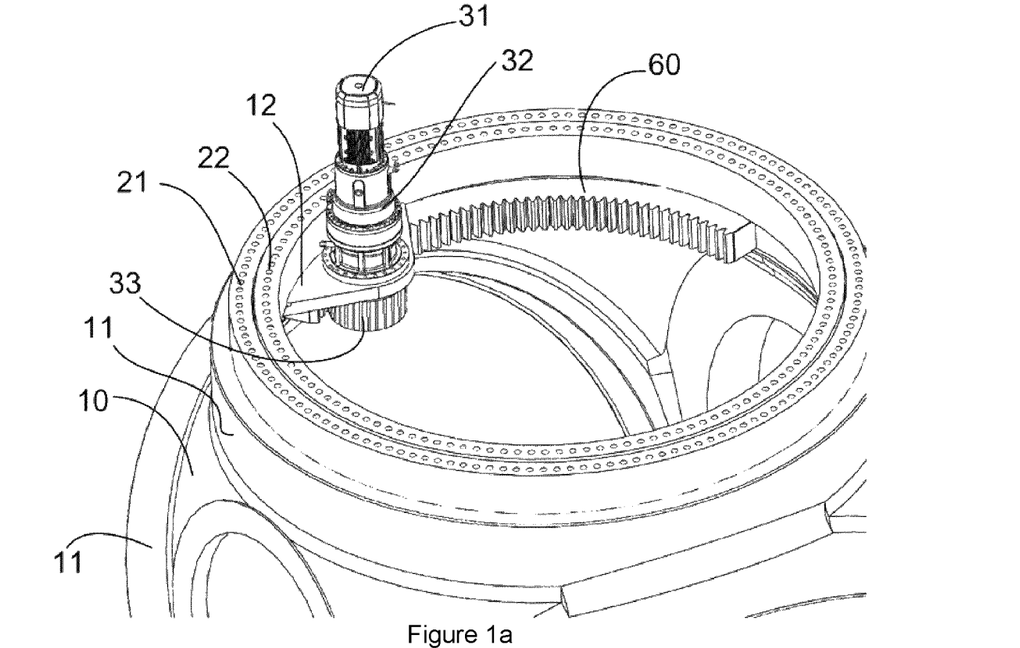
FIGS. 1a-1d illustrate a first and second embodiment of a wind turbine rotor according to the present invention.

FIG. 1a illustrates a first embodiment of a wind turbine rotor according to the present invention. The rotor comprises a hub 10 to which a plurality of blades (not shown) may be attached at respective mounting flanges 11.

A pitch mechanism may be provided for rotating each of the blades along their longitudinal axes. The pitch mechanism may comprise a pitch motor 31 which is operatively connected with a pinion 33 for driving said pinion. Reduction gearing 32 may be provided between the pitch motor 31 and the pinion 33. Reduction gearing serves to transform the high speed rotation with lower torque of the motor into a low speed rotation with higher torque of the pinion. The pitch mechanism furthermore comprises a partial ring gear 60. The partial ring gear 60 in this embodiment is a single unitary piece. The pinion 30 is arranged such that its teeth mesh with the teeth of the partial ring gear. The ring gear 60 in this embodiment is attached at the hub and covers an arc of approximately 110°. In order to be able to reach all relevant pitch positions of a blade, an arc of approximately 90° is enough in most wind turbines. In preferred embodiments of the present invention the partial ring gear therefore covers an arc between 85°-120°.

A pitch bearing may further be provided comprises an outer bearing ring 21 and an inner bearing ring 22. Between the two bearing rings, one or more rows or rolling elements 23 (see e.g. FIG. 1d) may be provided. In the embodiment shown, the outer bearing ring 21 is connected to the hub, whereas a blade (not shown) is connected to the inner bearing ring 22.

Actuation of the pitch motor 31 may thus lead to a rotation of a pinion 33. Pinion 33 meshes with partial ring gear 60 so that a rotation of the blade and inner bearing ring 22 with respect to hub 10 and outer bearing ring 21 is established. The pitch of the wind turbine blade may thus be changed.

As may be seen in FIG. 1a, the partial ring gear 60 is not provided on one of the bearing rings (contrary to prior art systems). This permits easier repair, manufacture and installation of the ring gear. Additionally, since only a partial ring gear is provided, manufacturing cost may further be reduced.

A motor support flange 12 may be connected to the inner bearing ring 21 and supports the motor 31, gearing 32 and pinion 33.

Figure 1B:
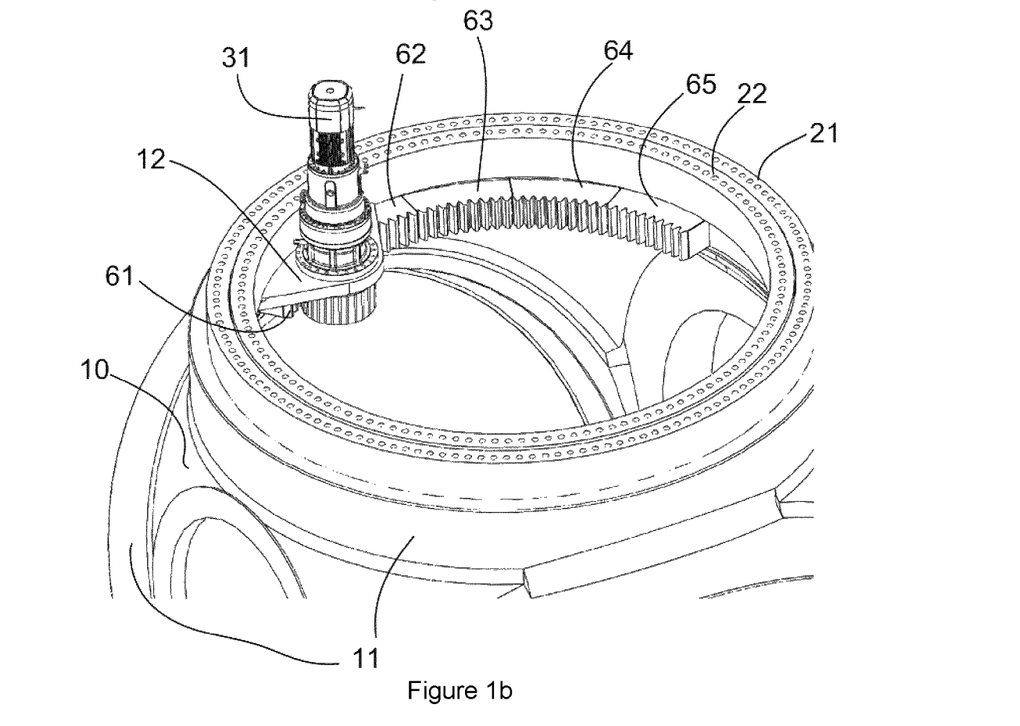
Figure 1C:
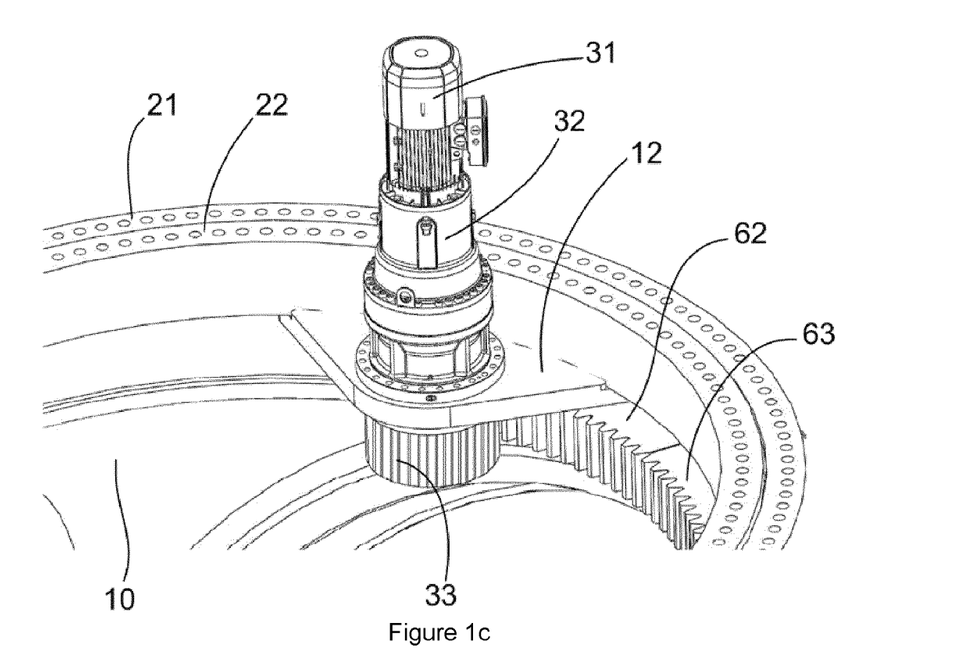
Figure 1D:
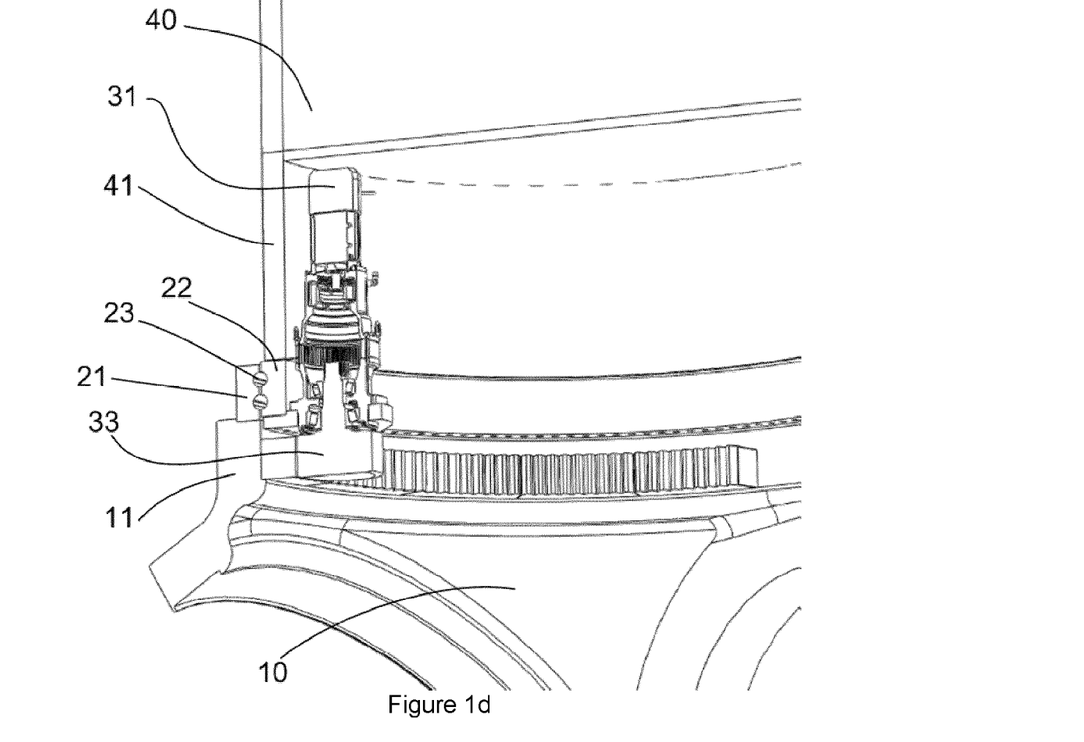

FIGS. 1b-1d illustrate different views of a second embodiment of a wind turbine rotor. Same reference signs are used to denote the same parts or components. The main difference between this embodiment and the previous one is that the partial ring gear is not formed by a single unitary piece, but rather comprises five segments 61, 62, 63, 64 and 65, each covering a 22° arc.

The operation of this embodiment and the structural arrangement of all other components are substantially the same as hereinbefore described. An advantage of providing a plurality of segments for forming the partial ring gear is that if the teeth of the first segment 61 are damaged or worn, segment 61 may simply be interchanged with one of the other segments. One particular segment may be subject to more wear since blades spend most of the time in the same position and continuous contact between the flanks of the teeth in this position may cause local damage. In this embodiment, segment 61 may be interchanged with another segment, segment 61 may be flipped around ("inverted"), or segment 61 may be substituted by another segment (and none of the other segments need necessarily be replaced).

In the embodiment of FIG. 1a, repair may take place either by complete substitution of partial ring gear 60, or by inverting it. In embodiments wherein the arc of the partial ring gear is large enough, a slight displacement of the ring gear may also be useful. Other teeth of the ring gear may be in contact with the pinion in the prevalent position of the blade.

In FIG. 1c an edge portion of the motor support flange 12 is connected to the inner bearing ring 22. Suitable holes for bolts may be provided at the bottom (in the sense of FIG. 1c) of ring gear 60 for this purpose.

FIG. 1d illustrates how a wind turbine blade 40 is connected to inner bearing ring 22 such that it can rotate with respect to the outer bearing ring 21 and hub 10. In the particular embodiment shown, the wind turbine blade 40 comprises an extender 41. It will be clear however that in other embodiments, a wind turbine blade does not necessarily comprise an extender. Extenders generally may be provided for increasing the diameter of a wind turbine without increasing the length of the blade.

Figure 4:
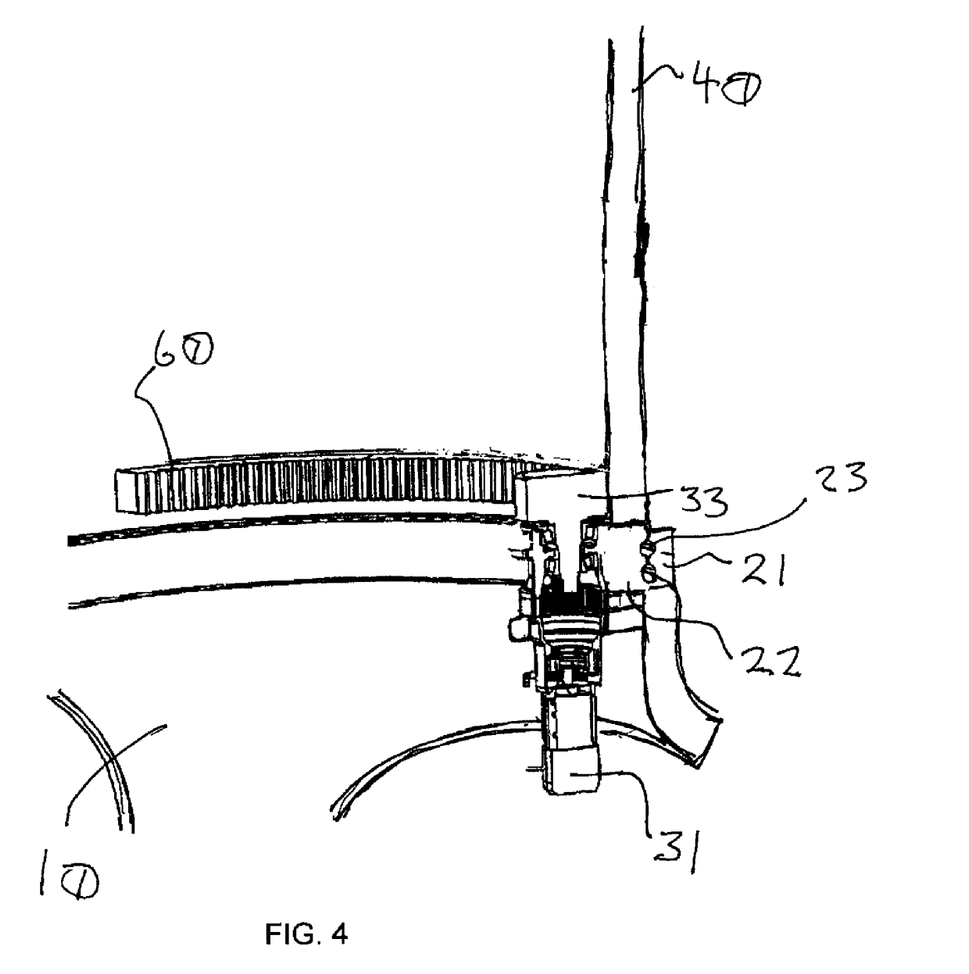
FIG. 4 illustrates another embodiment of a wind turbine rotor according to the present invention.

FIG. 4 is the same as FIG. 1d, except that the partial ring gear 60 is mounted on the blade 40. In FIG. 1d the gear 60 is mounted on the hub 10. Certain details of the reduction gearing and bearings of pinion 33 may further be seen in FIG. 1d. In embodiments of the invention, the reduction gearing may comprise epicyclic gearing comprising 1 or more stages. Epicyclic gearing is generally used to occupy the least space. In other embodiments however, other types of reduction gearing may be used.

Figure 2A:
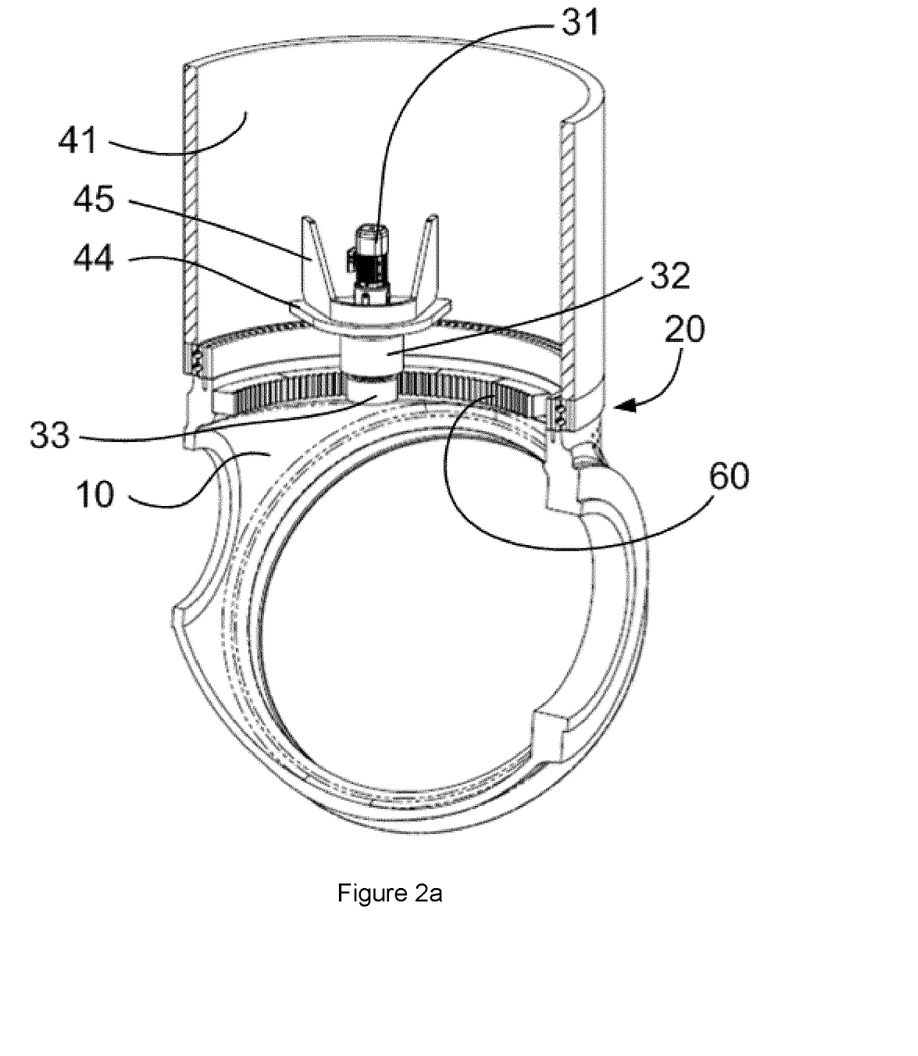
FIGS. 2a-2b illustrate another embodiment of a wind turbine rotor according to the present invention.
Figure 2B:
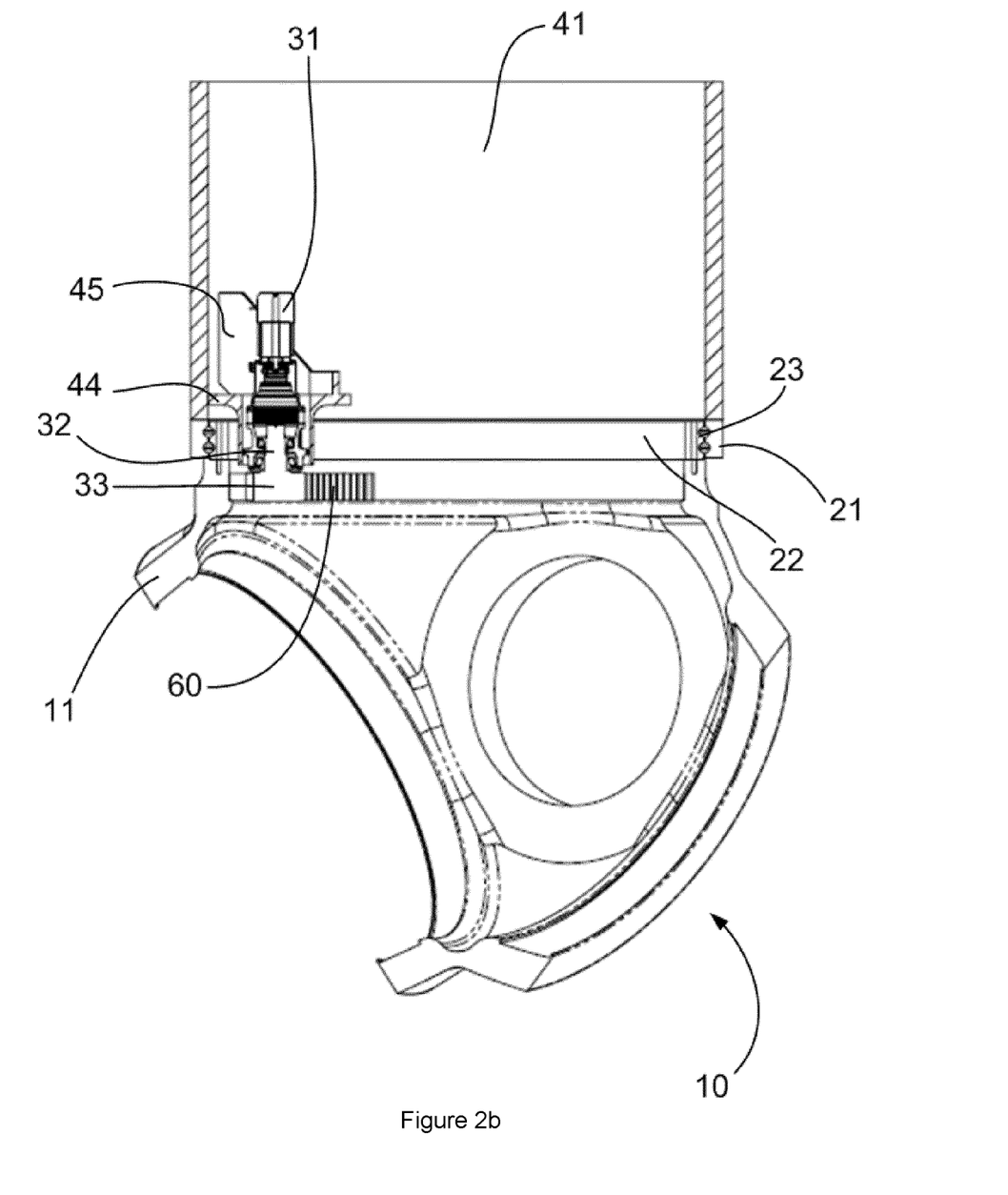

FIGS. 2a and 2b illustrate a further embodiment of the present invention. In this embodiment, pitch bearing 20 comprises once again an outer bearing ring 21, an inner bearing ring 22 and two rows of rolling elements 23. In this embodiment, extender 41 of the blade is connected at the outer bearing ring 21, whereas the inner bearing ring is connected at the hub 10 (in the embodiments of FIG. 1, the hub was connected at the outer bearing ring and the blade at the inner bearing ring).

A further difference with the previously shown embodiments is that a motor support flange 44 is connected to the extender (or may be integrated therewith). A protective housing 45 may further be provided around pitch motor 31.

Figure 3:
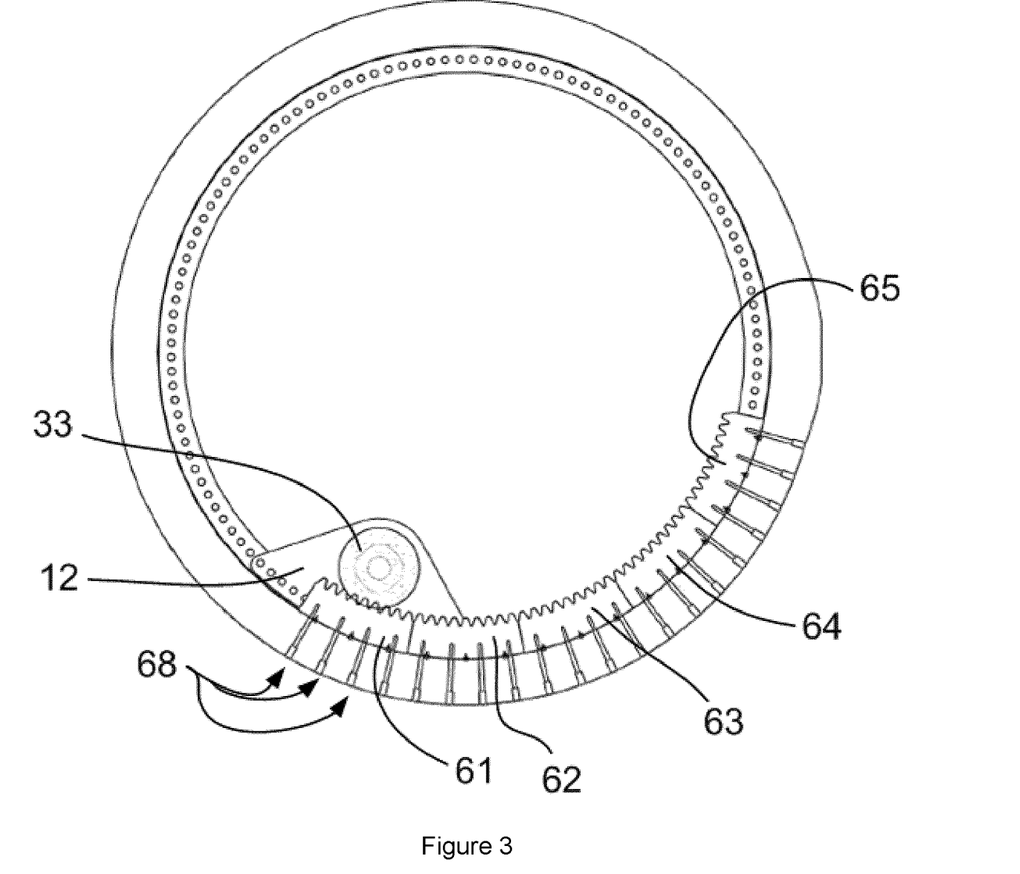
FIG. 3 illustrates a partial ring gear which may be used in embodiments of the present invention.

Similarly as before, a partial ring gear comprising five segments is provided. It will be clear that the number of segments may be varied and also their respective lengths may be freely varied. Further, it will be clear that any other type of pitch bearing may be used within the scope of the present invention. FIG. 3 illustrates a method of mounting a partial ring gear to either the hub or the blade. Segments 61-65 may be attached using suitable bolts 68. Bolt holes may be provided both in the segments 61-65 and in the hub (or blade).

In the embodiments illustrated in the figures, the partial ring gear was shown to be attached at the hub. However, in other embodiments, the partial ring gear may be attached at the blade, or at an extender if present. Additionally, in the embodiments illustrated in the figures, the partial ring gear is provided in the interior of the hub and blade, but in alternative embodiments, the partial ring gear (and pitch motor) may be provided external to the hub and blade. The pitch mechanism would work in substantially the same way, and the advantages offered by embodiments of the present invention would also substantially be the same.

Within the scope of the present invention, it is further possible to provide more than one pitch mechanism (each including a motor, pinion, and partial ring gear) for the rotation of a single blade.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine rotor comprising a hub, a plurality of blades, and at least one pitch mechanism for rotating at least one of the blades,
   each pitch mechanism comprising a partial ring gear, a pitch bearing, a pinion that is arranged to mesh with the partial ring gear and a pitch motor arranged for driving the pinion, wherein
   the pitch bearing comprises an inner bearing ring, an outer bearing ring, and one or more rows of rolling elements between them, wherein
   one of the inner and outer bearing rings is connected with the hub and the other of the inner and outer bearing rings is connected with the blade, wherein
   the ring gear is mounted directly on the hub or on the blade, and the ring gear is a component formed separately from the inner bearing ring and the outer bearing ring and axially spaced from the inner bearing ring and the outer bearing ring along an axis of rotation of the inner bearing ring and the outer bearing ring.

2. The wind turbine rotor according to claim 1, wherein the blade comprises an extender, the pitch bearing arranged between the hub and the extender.

3. The wind turbine rotor according to claim 1, wherein the ring gear is mounted on the blade.

4. The wind turbine rotor according to claim 1, wherein the ring gear is mounted on the hub.

5. The wind turbine rotor according to claim 1, wherein the inner bearing ring is connected with the hub and the outer ring is connected with the blade.

6. The wind turbine rotor according to claim 1, wherein the inner bearing ring is connected with the blade and the outer ring is connected with the hub.

7. The wind turbine rotor according to claim 1, wherein the partial ring gear covers substantially a 90 degrees arc.

8. The wind turbine rotor according to claim 7, wherein the partial ring gear comprises a plurality of segments.

9. The wind turbine rotor according to claim 1, wherein the pitch mechanism comprises a single pinion.

10. The wind turbine rotor according to claim 1, wherein the partial ring gear is releasably attached to the huh or the blade.

11. A method of repairing a partial or complete ring gear in a wind turbine rotor according to claim 1, the ring gear comprising a plurality of segments, the method comprising
    detaching at least one of the segments of the ring gear and attaching the segments of the ring gear in a modified configuration.

12. The method according to claim 11, wherein the modified configuration comprises a different orientation of one or more of the segments of the ring gear.

13. The method according to claim 11, wherein the modified configuration comprises a different position of one or more of the segments of the ring gear.

14. The method according to claim 11, wherein the modified configuration comprises at least one different segment.

* * * * *